United States Patent [19]

Fisher et al.

[11] 4,032,595

[45] June 28, 1977

[54] ANTISTATIC AGENTS

[75] Inventors: Ian Stuart Fisher; James Eric McIntyre, both of Harrogate, England

[73] Assignee: Imperial Chemical Industries Limited, London, England

[22] Filed: Aug. 5, 1975

[21] Appl. No.: 601,978

Related U.S. Application Data

[62] Division of Ser. No. 428,314, Dec. 26, 1973, abandoned.

[30] Foreign Application Priority Data

Jan. 12, 1973 United Kingdom ............ 1733/73

[52] U.S. Cl. ............... 260/857 PE; 260/857 TW; 260/860; 260/DIG. 15; 260/DIG. 17; 526/5
[51] Int. Cl.$^2$ ............................................. C08K 5/11
[58] Field of Search ............ 260/DIG. 17, DIG. 15, 260/860; 526/5

[56] References Cited

UNITED STATES PATENTS

| | | | |
|---|---|---|---|
| 2,556,045 | 6/1951 | Serdynsky et al. | 260/DIG. 15 |
| 3,061,620 | 10/1962 | Kirkpatrick et al. | 260/404.8 |
| 3,329,557 | 7/1967 | Mozat et al. | 260/860 X |
| 3,388,104 | 6/1968 | Crovatt | 260/78 L |
| 3,652,713 | 3/1972 | Akazaki et al. | 260/860 |
| 3,655,821 | 4/1972 | Lofquist et al. | 260/860 X |
| 3,849,242 | 11/1974 | Takeya et al. | 260/DIG. 17 |

FOREIGN PATENTS OR APPLICATIONS

| | | | |
|---|---|---|---|
| 43-16290 | 9/1968 | Japan | 260/DIG. 15 |
| 1,139,646 | 1/1969 | United Kingdom | |

*Primary Examiner*—Sandra M. Person
*Attorney, Agent, or Firm*—Cushman, Darby & Cushman

[57] ABSTRACT

The reaction product of a polyalkoxylated triglyceride with an ester of oxalic or malonic acid in the ratio of at least 2 molecules of the latter to 1 molecule of the former, also synthetic polymers containing a minor proportion of the reaction product.

12 Claims, No Drawings

ANTISTATIC AGENTS

This is a division, of application Ser. No. 428,314 filed Dec. 26, 1973 and now abandoned.

The present invention relates to the reaction products of polyalkoxylated glycerides and an ester or ester-forming derivative of oxalic acid or malonic acid, and to mixtures of such reaction products with a high molecular weight polymer.

U.S. Pat. No. 956,833 describes and claims antistatic oriented melt-spun fibres, comprising a polyester and, uniformly admixed therein as a separate phase, at least 2% by weight of a high molecular weight poly(alkylene ether) said poly(alkylene ether) being substantially non-reactive with and insoluble in the polyester and stable under melt spinning conditions, and distributed throughout the fibre structure in the form of elongated particles having their longest dimension parallel to the fibre axis. U.S. Pat. No. 963,320 describes and claims an analogous product comprising a polyamide, the poly(alkylene ether) being capped by at least one ether end group and being of average molecular weight at least 600, and the elongated particles having a mean diameter between 0.05 and 2 microns.

U.S. Pat. No. 1,139,646 describes and claims a fibre-forming synthetic linear polycarbonamide having recurrent amide groups as an integral part of the main polymer chain, wherein said groups are separated by at least two carbon atoms, characterized by containing from 0.1 to 20.0 weight percent based on the weight of said polycarbonamide, of a polyalkoxylated glyceride having the general formula:

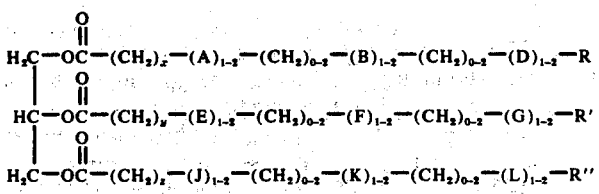

wherein $x$, $y$ and $z$ are integers of from 1 to 22; R, R' and R" are $C_nH_{2n+1}$, where $n$ is an integer from 1 to 23; A,B,D,E,F,G,J,K and L are selected from

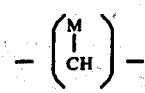

and $-(CH=CH)-$
where M is selected from the group consisting of

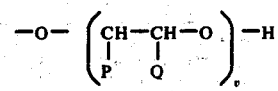

and H, were P and Q are selected from the group consisting of methyl and H, and $v$ is an integer greater than O; provided that at least one of A, B, D, E, F, G, J, K and L is other than $-(CH=CH)-$, at least one M is other than hydrogen, and the sum of V is equal to a value between 10 and 500.

We have found difficulty in producing a satisfactory dispersion of the relatively low viscosity poly(alkylene ethers) and polyalkoxylated glycerides of U.S. Pat. Nos. 956,833, 963,320 and 1,139,646.

According to the present invention we provide a reaction product of
a. a compound of the formula:

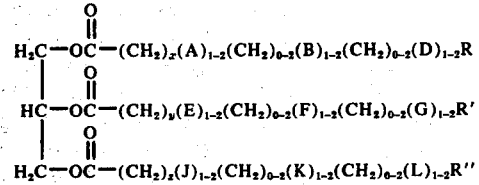

wherein $x$, $y$ and $z$ are integers of from 1 to 22; R,R' and R" are $C_nH_{2n+1}$, where $n$ is an integer from 1 to 23; A,B,D,E,F,G,J,K and L are selected from

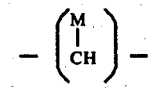

and $-(CH=CH)-$
where M is selected from

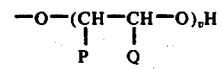

and H, where P and Q are selected from methyl and H, and $v$ is an integer greater than O; provided that at least one of A,B,D,E,F,G,J,K and L is other than $-(CH=CH)-$, at least one M is other than hydrogen, and the sum of $v$ is equal to a value between 10 and 500, with (b) an ester of oxalic acid or of malonic acid, the molecular ratio of (b) to (a) being at least 2:1.

Preferred reaction products are those of polyalkoxylated castor oil with an ester of oxalic acid or malonic acid and those of polyalkoxylated hydrogenated castor oil with an ester of oxalic acid or malonic acid.

According to our invention we also provide a mixture of a minor proportion of at least one reaction product as hereinbefore described in a synthetic polymer. Preferably the proportion of reaction product employed should not be less than 1%, since below this level the antistatic effect is negligible, and should not exceed 20%, since above this level the production of shaped articles from the melt of satisfactory quality becomes difficult. The percentage of reaction product is by weight related to the synthetic polymer. We prefer the proportion of reaction product to be from 2 to 10%.

Examples of polymers with which the reaction products may be mixed are polyesters, particularly polyethylene terephthalate and polyamides, particularly nylon 6 or nylon 6:6, and copolyamides containing isophthalate or terephthalate linkages.

The mixture of polymer and reaction products may be produced by any convenient method, for example by addition to the reaction products used in the manufacture of the polymer, when the conditions are appropriate, by addition to the polymer melt after completion of the polymer formation, by addition to the solidified polymer before remelting prior to shaping and by addition to the polymer melt immediately prior to shaping. We prefer the last of these methods since, for example, it allows maximum flexibility of operation. For example, when a proportion of the shaped articles being formed from the polymer is required to contain a different proportion of the reaction product, change in the proportion is readily effected with minimum production of mixtures not of the required composition. Such late addition to the polymer of the reaction product also has an advantages in that the time available for chemical reaction of the reaction product with the polymer is minimized. The mixture of polymer and reaction product is of particular utility when the polymer is fibre- and film-forming and the mixture is formed into filaments or films.

The mixing of polymer with reaction product may be effected by any convenient method, for example the use of a dynamic mixer, involving intense shearing or the use of a static mixer, involving the repeated splitting of molten polymer and the reaction product into layers and recombination in different juxtaposition.

In view of the fact that the reaction product of our invention has a relatively high melt viscosity, preferably this should be greater than 10 poises at 100° C., it is relatively easy to effect mixing with the molten polymer, which itself is of high melt viscosity as normally used for fabrication into shaped articles, for example filaments, films and mouldings.

An advantage of the mixture of polymer with the reaction product of our invention, is that when it is used for fabrication into shaped articles, the articles have antistatic properties. The antistatic effect is retained after washing, for example when in the form of filaments.

The reaction to produce the reaction product of our invention may, for example, be carried out at elevated temperature, for example above 170° C. In order to facilitate the reaction, at least one known ester-interchange catalyst may be present during the reaction in order to speed up the rate of reaction. It is believed that in the reaction to produce the reaction product according to our invention, reaction taken place between a hydroxy end group of a poly(alkylene oxy) chain and an ester group of the oxalic or malonic acid derivative. The second ester group of the oxalic or malonic acid ester may then react with a hydroxyl end group of a poly(alkylene oxy) group of another molecule, with resultant cross-linking or chain extension. Such reaction results in increase in melt viscosity, which has the desirable effects hereinbefore discussed. We do not, however, wish to be in any way limited by this explanation.

It will be seen that, according to our explanation of the reaction to produce the reaction product according to our invention, the reaction product will be a mixture of compounds of the type described.

The molecular ratio of (b) to (a) is preferably no higher than 20:1. We prefer that the ratio of (b) to (a) should not exceed 10:1.

Preferably the reaction of (a) and (b) is carried out at a temperature not less than 170° C. A higher temperature than 250° C. can be used but decomposition of the product becomes more pronounced at temperatures in excess of 250° C. More preferably the reaction is carried out at 200° to 250° C.

A suitable ester of oxalic acid or malonic acid may, for example, be the dialkyl ester derived from a monohydric alcohol of from 1 to 4 carbon atoms, more preferably 1 to 3 carbon atoms. Most preferably the dialkyl ester should be the diethyl ester.

The mixture of polymer and reaction product according to our invention is a heterogeneous mixture with the reaction product forming a separate phase in the form of droplets. On forming the mixture into filaments, the reaction product takes the form of elongated particles with greatest dimension in the direction of the length of the filament.

Other additives commonly present in polymers when fabricated into shaped articles may also be present, for example delustrants, coloring materials, anti-flammability compounds and stabilizers.

EXAMPLE 1

Ethoxylated hydrogenated castor oil (ethoxylated with 200 moles of ethylene oxide per mole of hydrogenated castor oil) was reacted with 5 moles of dimethyl oxalate per mole of ethyoxylated hydrogenated castor oil at 250° C. for 120 minutes using manganese acetate as catalyst while the reaction mixture was stirred in an atmosphere of nitrogen. The melt viscosity of the product was measured in a Ferranti viscometer and was found to be 82 poise at 100° C.

EXAMPLES 2 TO 13

Further examples were carried out in which for dimethyl oxalate there was substituted other ester as specified in column 2 of Table 1 and in the molar ratio as specified in column 3 of Table 1. The temperature and time of reaction are also given in the Table and the melt viscosity.

TABLE 1

| Example | Reactant | Ratio EHCO to reactant (molar) | Reaction temperature | Time, minutes | Catalyst | Melt viscosity, poise at 100° C. |
|---|---|---|---|---|---|---|
| 1 | dimethyl oxalate | 1:5 | 250 | 120 | manganese acetate | 82 |
| 2 | diethyl oxalate | 1:2 | 200 | 60 | none | 8.2 |
| 3 | " | 1:2.5 | 200 | 60 | " | 33 |
| 4 | " | 1:3 | 200 | 60 | " | 28 |
| 4 | " | 1:5 | 200 | 60 | " | 46 |
| 5 | " | 1:5 | 200 | 60 | " | 46 |
| 6 | " | 1:5 | 200 | 120 | " | 225 |
| 7 | " | 1:5 | 250 | 2 | " | 138 |
| 8 | " | 1:10 | 200 | 60 | " | 29 |
| 9 | " | 1:10 | 200 | 120 | " | 28 |
| 10 | " | 1:10 | 250 | 45 | " | 282 |
| 11 | " | 1:5 | 185 | 120 | " | 78 |
| 12 | diethyl malonate | 1:5 | 200 | 60 | manganese acetate | 10 |

TABLE 1-continued

| Example | Reactant | Ratio EHCO to reactant (molar) | Reaction temperature | Time, minutes | Catalyst | Melt viscosity, poise at 100° C. |
|---|---|---|---|---|---|---|
| 13 | " | 1:5 | 200 | 60 | manganese acetate | 33 |

EXAMPLES 14 TO 27

These are comparative examples showing that the use in the process of our invention of esters other than those of oxalic or malonic acid, or of ratios of reactant to ethoxylated hydrogenated castor oil less than 2:1 give inferior results in respect of melt viscosity of the product. The results are given in Table 2.

TABLE 2

| Example | Reactant | Ratio EHCO to reactant (molar) | Reaction temperature | Time, minutes | Catalyst | Melt viscosity, poise at 100° C. |
|---|---|---|---|---|---|---|
| 14 | dimethyl oxalate | 1:1 | 250 | 60 | manganese acetate | 6.2 |
| 15 | diethyl oxalate | 1:1 | 250 | 60 | manganese acetate | 3 |
| 16 | diethyl succinate | 1:4 | 200 | 60 | none | 2.9 |
| 17 | " | 1:4 | 250 | 60 | none | 3.4 |
| 18 | " | 1:5 | 250 | 120 | manganese acetate | 3 |
| 19 | dimethyl adipate | 1:2 | 300 | 300 | manganese acetate | 4.5 |
| 20 | diethyl sebacate | 1:5 | 200 | 120 | none | 1.7 |
| 21 | dimethyl phthalate | 1:5 | 250 | 60 | manganese acetate | 4 |

EXAMPLE 22

Ethoxylated hydrogenated castor oil (ethoxylated with 200 moles of ethylene oxide per mole of hydrogenated castor oil) was reacted with 5 moles of dimethyl oxalate per mole of ethoxylated hydrogenated castor oil at 200° C. for 90 minutes. The product had melt viscosity 86 poise at 100° C. This is product I.

Poly(ethylene terephthalate) having intrinsic viscosity 0.65 as measured in orthochlorophenol at 25° C. was prepared by a conventional method. This is product II.

Product II (10 parts by weight) was mixed with product I (1 part by weight) by thorough mixing of the components using a stainless steel helical screw mixer. The resultant mixture was forced out of the mixer and granulated. This is product III.

Product III was dried at 135° C. for 5 hours at a pressure of 0.01 mm. and was then melt spun and the resultant filaments drawn at a draw ratio of 4.5:1 to give a yarn of 176 decitex and 30 filaments. This yarn was knitted into a hose leg.

The antistatic properties of the hose leg fabric were assessed by clipping a portion of the washed and dried fabric, conditioned at a preselected humidity, for 16 hours, to a steel plate inclined at an angle of 30° to the vertical and stroking it 12 times over a period of 20 seconds with a block of wood covered with nylon fabric. The static charge generated by the stroking caused the fabric to cling to the plate, and the time taken for the fabric to discharge and release itself from the plate was a measure of its antistatic properties.

At a relative humidity of 20%, the fabric had a discharge time between 14 and 18 seconds, and at 40% humidity the discharge time was 5 to 8 seconds; these times remained unchanged after further washing or pressure dyeing of the fabric.

In contrast, fabric produced from the same poly(ethylene terephthalate) (Product II) alone had a discharge time under the test hereinbefore described greater than 300 seconds. In this test, a fabric having a discharge time of less than 100 seconds may be regarded as having good antistatic properties, whereas a time greater than 300 seconds may be regarded as corresponding to a highly static prone fabric.

EXAMPLE 23

The procedure of Example 22 was repeated with the exception that 95 parts by weight of product II was mixed with 5 parts by weight of product I. The resultant mixture was treated as described in Example 22 including melt-spinning and conversion into hose leg fabric. The antistatic properties were tested as described in Example 22 and gave cling times as follows:

20% relative humidity    60 seconds,
40% relative humidity    20 seconds,

EXAMPLE 24

Ethoxylated hydrogenated castor oil (ethoxylated with 400 mol of ethylene oxide per mol of hydrogenated castor oil) was reacted with diethyl oxalate in the ratio of 1 mol of ethoxylated castor oil to 5 mol of diethyl oxalate. Reaction was carried out at 200° C. under a slow stream of nitrogen in a stirred reaction vessel equipped with a take-off condenser and receiver. After 120 minutes, the reaction was discontinued. The viscosity had increased from an initial value of 6 poise at 100° C. to a final value of 45 poise at 100° C.

The product IV (10 parts by weight) was mixed with poly(ethylene terephthalate) (product II of Example 22, 90 parts by weight) as described in Example 22. After drying, melt spinning and knitting, the hoseleg was dyed in a sealed vessel under autogenous pressure at 130° C. for 1 hour in an aqueous dye liquor (1:30 goods to liquor ratio) containing 2% by weight of the hoseleg of the dyestuff C.I. Disperse Yellow 39, buffered at pH 5.5.

What we claim is:

1. A synthetic polymer mixture containing a minor proportion of at least one reaction product of (a) a compound of the formula:

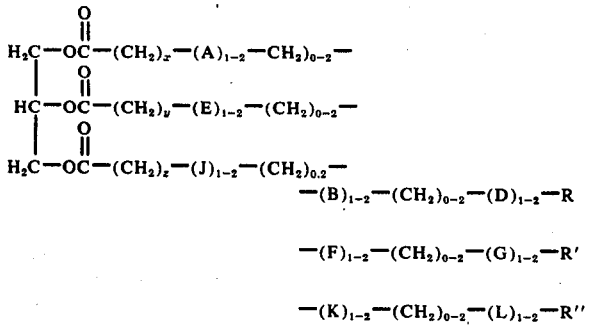

wherein $x$, $y$ and $z$ are integers of from 1 to 22; R, R' and R" are $C_nH_{2n+1}$, where $n$ is an integer from 1 to 23; A, B, D, E, F, G, J, K and L are selected from

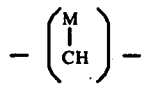

and —(CH=CH)—
where M is selected from

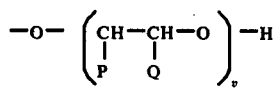

and H, where P and Q are selected from methyl and H, and $v$ is an integer greater than 0; provided that at least one of A, B, D, E, F, G, J, K and L is other than —(CH=CH)—, at least one M is other than hydrogen, and the sum of $v$ is equal to a value between 10 and 500, with (b) an ester of oxalic acid or of malonic acid, the molecular ratio of (b) to (a) being at least 2:1.

2. A method of making a synthetic polymer mixture as set forth in claim 1 which comprises mixing with a synthetic polymer a minor proportion of a reaction product formed by reacting (a) a compound of the formula:

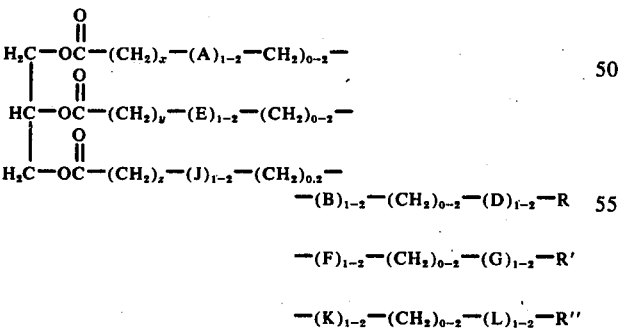

wherein $x$, $y$ and $z$ are integers of from 1 to 22; R,R' and R" are $C_nH_{2n+1}$, where $n$ is an integer from 1 to 23; A, B, D, E, F, G, J, K and L are selected from

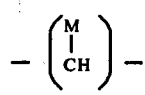

and —(CH=CH)— where M is selected from

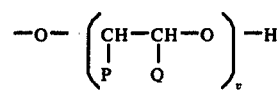

and H, where P and Q are selected from methyl and H, and $v$ is an integer greater than 0; provided that at least one of A, B, D, E, F, G, J, K and L is other than —(CH=CH)—, at least one M is other than hydrogen, and the sum of $v$ is equal to a value between 10 and 500, with (b) an ester of oxalic acid or of malonic acid, the molecular ratio of (b) to (a) being at least 2:1 at an elevated temperature in the presence of an ester-interchange catalyst.

3. The method of claim 2 wherein from about 2 to 10% of said reaction product is added to said polymer.

4. The method according to claim 2 wherein the elevated temperature is about 170° C. or greater.

5. A method of imparting anti-static qualities to synthetic polymers which comprises adding to a synthetic polymer a minor proportion of a reaction product of (a)

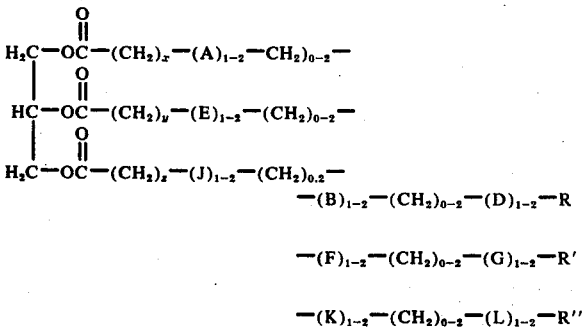

wherein $x$, $y$ and $z$ are integers of from 1 to 22; R, R' and R" are $C_nH_{2n+1}$, where $n$ is an integer from 1 to 23; A, B, D, E, F, G, J, K and L are selected from

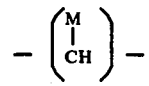

and —(CH=CH)— where M is selected from

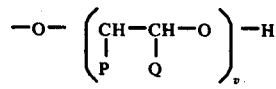

and H, where P and Q are selected from methyl and H, and $v$ is an integer greater than 0; provided that at least one of A, B, D, E, F, G, J, K and L is other than —(CH=CH)—, at least one M is other than hydrogen, and the sum of $v$ is equal to a value between 10 and 500, with (b) an ester of oxalic acid or of malonic acid, the molecular ratio of (b) to (a) being at least 2:1.

6. A mixture comprising from 1 part by weight to 20 parts by weight of at least one rection product according to claim 1 in 100 parts by weight of a synthetic polymer.

7. A mixture comprising from 2 parts by weight to 10 parts by weight of at least one reaction product according to claim 1 in 100 parts by weight of a synthetic polymer.

8. A mixture according to claim 1 wherein the synthetic polymer is fibre- or film-forming.

9. A mixture according to claim 1 wherein the polymer is a polyamide or a polyester.

10. A mixture according to claim 1 wherein the polymer is poly(ethylene terephthalate).

11. A mixture according to claim 1 wherein the polymer is nylon 6 or nylon 6:6 and copolyamides containing isophthalate or terephthalate linkages.

12. Filaments or films comprising a mixture according to claim 1.

* * * * *